Nov. 24, 1959  A. V. HINTON  2,914,022
BIRD CAGE
Filed Jan. 2, 1958
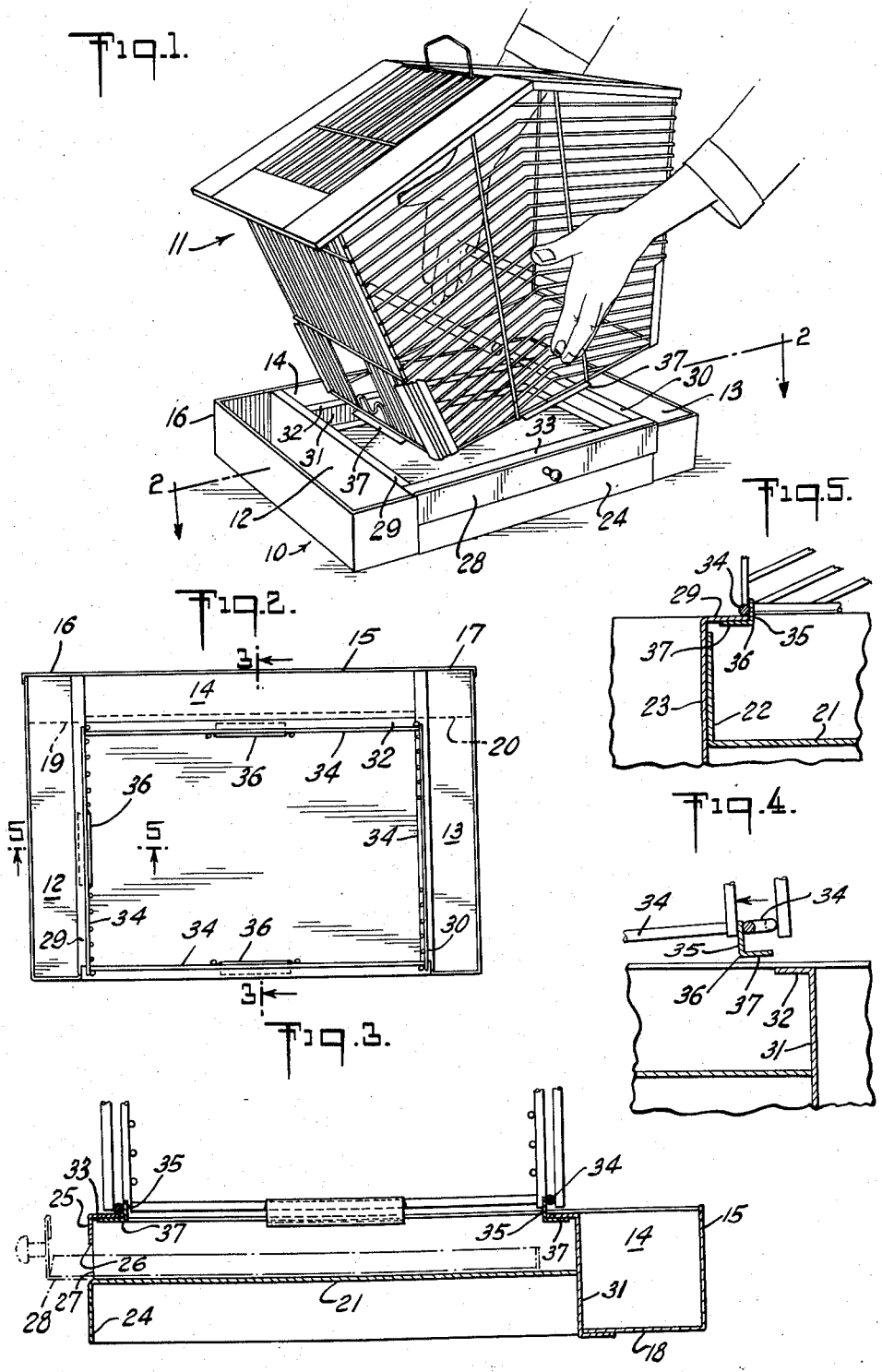

United States Patent Office 2,914,022
Patented Nov. 24, 1959

2,914,022
BIRD CAGE
Alan V. Hinton, Brooklyn, N.Y.
Application January 2, 1958, Serial No. 706,624
1 Claim. (Cl. 119—17)

This invention relates to bird cages and more particularly to one having its upper cage section readily removable from its lower base section.

Heretofore it has been customary to build bird cages with an upper section, i.e. the usual wire section which houses and confines the bird, integral with a lower or base section in which there usually is a bottom tray in the form of a drawer readily removable to facilitate cleaning. The top and bottom sections are welded or brazed together and, since the parts all have had metallic finishes, this construction has presented no problem.

However, more recently, bird cages have undergone much modification in design, typical of which is the incorporation with the cage of devices such as planters (to accommodate plants etc.). It is preferred that such planters be painted in different colors, in contrast with the metallic (chrome or brass) finish of the cage per se, and this presents a problem since to join cage and base first renders subsequent painting economically unfeasible whereas to paint the base first precludes subsequent welding and brazing together of the parts.

According to the invention, there is provided a bird cage having a base section, and upper cage section and intermediate devices which may be in the form of clips securing the two sections together, and which facilitate initial assembly after different treatment of the parts and later disassembly and reassembly to facilitate cleaning the cage, maintaining the planters or for any other purpose.

The invention is illustrated in the accompanying drawing wherein:

Figure 1 is a perspective view of a bird cage incorporating the present improvement and showing the upper cage section in the act of being assembled or disassembled from the lower base section;

Figure 2 is a horizontal sectional view taken on lines 2—2 of Figure 1 just above the lower base wire of the cage and when the upper and lower sections of the cage are properly assembled together.

Figure 3 is a fore and aft vertical sectional view on line 3—3 of Figure 2;

Figure 4 is a portion of the vertical view shown in Figure 3 on an enlarged scale but with the parts stressed to facilitate assembling together the lower base section and the upper, cage section; and Figure 5 is a vertical sectional view on an enlarged scale on line 5—5 of Figure 2.

The bird cage includes a lower base section 10 and an upper cage section 11. The base section, in the embodiment of the invention illustrated comprises three sheet metal plant troughs 12, 13, and 14, two of the troughs 12 and 13 extending in a fore and aft direction and located one at each end of the base, and the third trough 14 extending across the rear of the base and interconnecting the other two. All the troughs are closed at the sides, ends and bottom. They are opened at the top and their construction otherwise is immaterial except as hereinafter specifically pointed out.

A rear wall 15 of the rearmost laterally extending planter 14 extends beyond the ends of such planter to form the rear end walls 16 and 17 of the side planters. The base 18 of the rearmost planter also extends beyond the ends of such planters in underlying engagement with the bottoms of the side planters as at 19 and 20. Spot welding may be used to join the parts together.

The side planters 12 and 13 are secured together in advance of the rearmost planter by a flat horizontal member 21, preferably sheet metal, located about midway between the top and bottom of the planters. This member 21 is formed at its ends with upturned flanges 22 (only one being shown in Figure 5) spot welded to opposed sidewalls 23 of the side planters, and at its front with a downwardly turned flange 24 for strength and to give the base section a finished appearance.

The side planters are further connected together near the front by a horizontal cross member 25 having a downwardly extending flange whose lower edge 26 together with the underlying flat horizontal member 21 defines a slot 27 which accommodates a tray 28 that normally rests on the flat member 21. The tray constitutes the floor of the cage and may be withdrawn and replaced through the slot to facilitate cleaning.

The opposed inner walls of the side planters are formed at their upper edges one with a horizontal flange 29 and the other with a similar flange 30 which extend for a short distance inwardly toward each other. The front wall 31 of the rearmost planter at its upper edge is formed with a horizontal flange 32 extending forwardly. The front horizontal cross member 25 at its upper edge is formed with a horizontal flange 33 extending rearwardly. All these flanges are approximately in the same plane so that it may be said that the lower base section of the cage presents near its top an inwardly extending relatively rigid flange means whose purpose presently will be made clear.

The upper section of the cage 11 is of conventional spaced wire construction, preferably welded together. Its construction, insofar as this invention is concerned is of no moment otherwise than that its walls should all be connected together in an integral structure and preferably present a base wire 34 fixed at the lower edges thereof.

To the base wire 34 on three sides of the cage there is secured the vertical leg 35 of an L-shaped clip 36. The connection may be by welding and the size of the clip should be that necessary to give appropriate strength. The horizontal legs 37 of the L-shaped clips all extend outwardly and are adapted to engage beneath the inwardly extending flanges 29, 30, 31 and 32 of the base section to which reference has previously been made, the connection of the clips with the base wire 34 being such as to provide clearance between the base wire and the top of the horizontal legs 37.

Thus in assembling the parts, the upper section 11 of the cage may be grasped between the hands as shown in Figure 1 and the horizontal legs of the end clip (the one at the left) slipped under the base flange 29 at that end. The section 11 may be lowered in place and the horizontal leg of say, the front clip engaged beneath the adjacent base flange. The rear of the cage may now be flexed inwardly (Figure 4) until the horizontal leg of the clip on the rear clears the adjacent base flange 32. The leg of the rear clip is then located below the flange 32 and the side of the cage released whereupon the side of the cage will assume its normal unflexed position causing the leg to engage beneath the flange 32 (Figure 3).

The upper cage section may be removed from the lower base section by performing the same operations but in reverse sequence. In normal use of the cage, transverse perches 38 are located fairly near the bottom of the cage. These perches are usually small wooden bars with diametrically extending slots in their opposite ends. These slots accommodate wires in the front and rear walls of the cage and the length of the perches is such as to hold them in position by friction. The perches are removed during the assembly and disassembly of the cage sections. However, when the parts are assembled and the perches are inserted in their appropriate positions near the lower edges of the front and rear walls they will hold the walls against inadvertent flexing inwardly, thus to insure that the cage sections remain properly locked together.

The invention has been described in connection with the preferred embodiment thereof but many modifications are included within its spirit. It is to be limited therefore, only by the scope of the appended claim.

The invention claimed is:

A bird cage comprising an upper bird confining cage section and a lower base section assembled together, said upper bird confining cage section including front, rear, and opposed end walls, all connected together and presenting at their lower edges a resilient but flexible wire defining a rectangular opening where said cage section is assembled with the base section, and said base section where it is assembled with the upper cage section presenting at its upper edges a relatively rigid flange defining a corresponding rectangular opening, and a plurality of angle clips fixed to said upper cage section at a plurality of opposed sides of the rectangular opening presented by the wire, said clips each having a horizontal leg arranged to engage beneath the flange of the base sections to hold the base section and the cage section together when the parts are assembled, the flexibility of the wire at the base of the cage sections being such as to permit at least one of said clips to be moved out of engagement with its associated flange upon application of a flexing force to said wire in the vicinity of such clip to permit disassembly of the said sections, and the resiliency of said wire being such as to cause said clip when its associated wire has been flexed and upon release of the flexing force to move into engagement with its associated flange when said clip and flange are located with respect to each other for proper assembly.

References Cited in the file of this patent

UNITED STATES PATENTS

| | | |
|---|---|---|
| 2,747,545 | Baldwin | May 29, 1956 |

FOREIGN PATENTS

| | | |
|---|---|---|
| 296,573 | Great Britain | Sept. 6, 1928 |
| 534,306 | Great Britain | Mar. 4, 1941 |